UNITED STATES PATENT OFFICE.

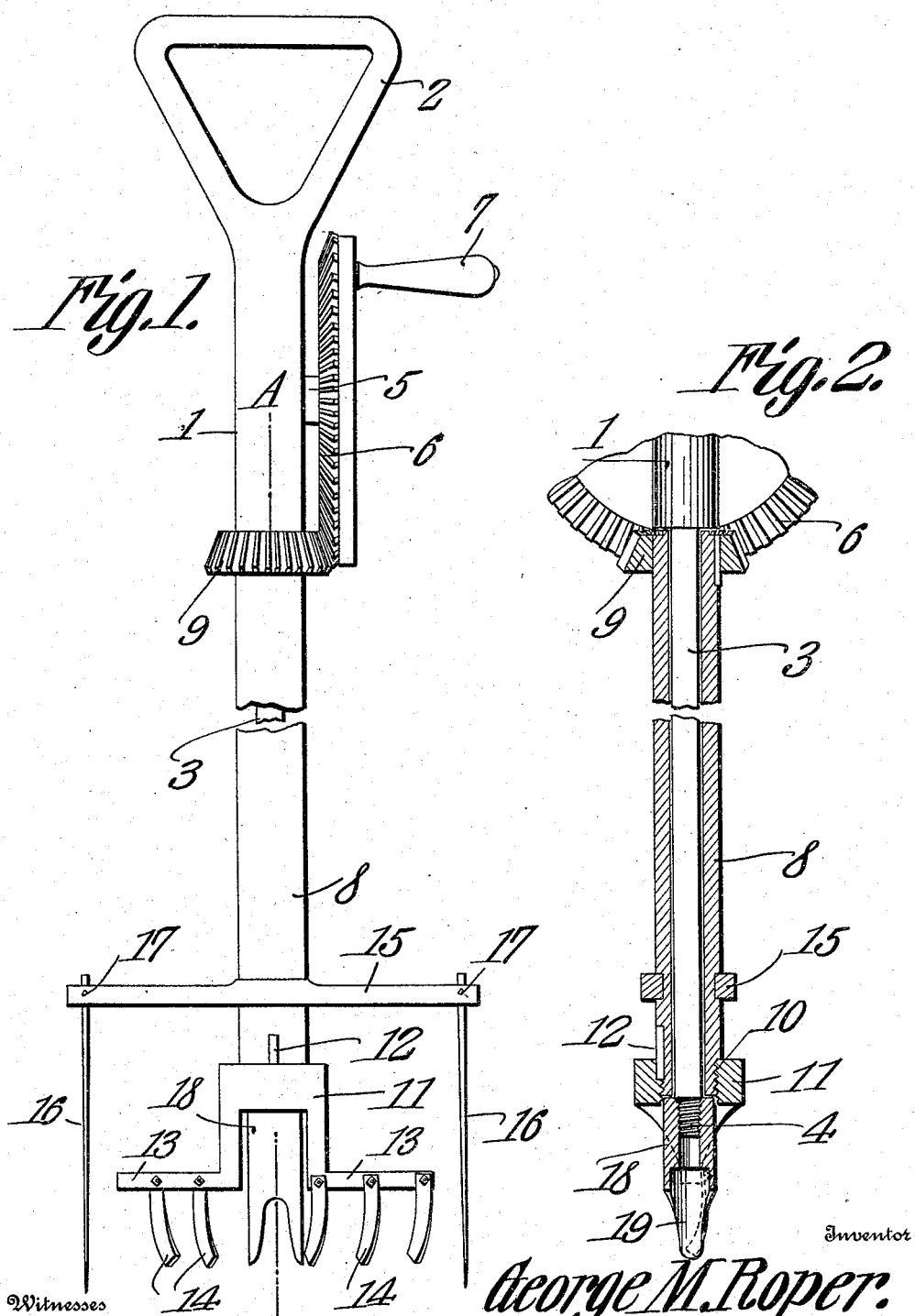

GEORGE M. ROPER, OF HICKMAN, KENTUCKY.

CULTIVATOR.

941,589. Specification of Letters Patent. Patented Nov. 30, 1909.

Application filed April 29, 1909. Serial No. 492,978.

*To all whom it may concern:*

Be it known that I, GEORGE M. ROPER, a citizen of the United States, residing at Hickman, in the county of Fulton and State of Kentucky, have invented a new and useful Cultivator, of which the following is a specification.

This invention relates to cultivators of that type designed to be operated by hand.

The object of the invention is to provide a device of this character which can be readily manipulated and which is designed to be placed in position over the plant so that when the cultivator is actuated the same operates to direct soil in the direction of or away from the plant according to the desire of the manipulator.

A further object is to provide a cultivator of this type having a fender which serves to prevent the plants from being covered by the soil directed toward them.

Another object is to provide a novel arrangement of cultivator teeth having means for moving them around the protected plant, there being two sets of teeth provided, the teeth of one set being movable in paths extending between the paths of the teeth in the other set.

With these and other objects in view the invention consists in certain novel details of construction and the combinations of parts hereinafter more fully described and pointed out in the claims.

In the accompanying drawings the preferred form of the invention has been shown.

In said drawings: Figure 1 is a front elevation of a cultivator constructed in accordance with the present invention. Fig. 2 is a longitudinal section therethrough on the line *a—b* of Fig. 1.

Referring to the figures by characters of reference, 1 designates the shank of the device, the same being provided at one end with a handle 2 while a stem 3 projects from the other end of the shank and has a screw threaded stud 4 at its free end. A stud 5 extends laterally from the shank 1 and has a drive gear 6 journaled thereon, this gear being provided with a handle 7 whereby it can be conveniently rotated.

A sleeve 8 is mounted for rotation upon the stem 3 and has a gear 9 keyed or otherwise secured to one end thereof and constantly in mesh with the gear 6. The other end of the sleeve is exteriorly screw threaded as shown at 10 and projects into and engages the middle portion of an arched cross-head 11, there being a key 12 or other suitable means for holding the cross-head against rotation upon the sleeve. Arms 13 are formed at the lower ends of the arms of the cross-head, these arms 13 extending in opposite directions and being disposed in alinement. A series of cultivator teeth 14 is secured to each arm 13, the teeth of the two series being so located that when the cross-head is revolved, the teeth of one series will travel in circles around the sleeve and between the paths of the teeth of the other series.

An annular groove 15 is formed within the sleeve 8 near the lower end of said sleeve and secured within the groove is the middle portion of a cross-strip 15 having anchoring pins 16 secured in the end portions thereof. These pins are held in place by means of set screws 17 or in any other preferred manner and are of sufficient length to project into the ground and thus hold the cross-strip in place during the rotation of the cross-head hereinafter set forth.

The stem 3 and the sleeve 8 are held in proper position with relation to each other by means of a fender consisting of a tubular body portion 18 interiorly threaded so as to detachably engage the said stud 4, there being oppositely disposed wings 19 at the lower end of the tubular body and the inner or adjoining faces of which are concaved transversely. These wings are designed to rest at opposite sides of a plant being cultivated.

In using the device herein described the anchoring pins 16 are inserted into the ground at such points as to permit the wings 19 of the fender to assume positions at opposite sides of the plant being cultivated. The gear 6 is then rotated by means of the handle 7, said handle being grasped in one hand while the handle 2 is grasped in the other end. Motion is transmitted from the gear 6 to the gear 9 and the sleeve 8 is thus caused to rotate above the stem 3. In asmuch as the arched head 11 is secured to the sleeve it will, obviously, rotate therewith, and the cultivator teeth 14 will thus travel in circles around the fender and direct the soil toward or away from the fender, according to the direction in which the cross-head is rotating.

If it is desired to dispense with the use of the fender the same can be unscrewed from the stud 4 and an ordinary nut substituted therefor.

It will be seen that the various parts of the cultivator can be readily disconnected for the purpose of cleaning them or making repairs and the device is also advantageous because of its light, durable, and compact construction, it being possible to readily carry it from place to place at will and to easily position it above the plant to be cultivated.

It is of course to be understood that various changes may be made in the construction and arrangement of parts without departing from the spirit or sacrificing the advantages of the invention.

What is claimed is:

1. A hand cultivator comprising a non-rotatable stem, a handle at one end thereof, a tubular member mounted for rotation on the stem, said member bearing at one end against the handle, tilling devices carried by said member, and a fender screwed upon one end of the stem and constituting means for holding the tubular member against displacement on said stem, said fender being interposed between the tilling devices.

2. A hand cultivator comprising a non-rotatable stem, a handle at one end thereof, cultivating devices mounted for rotation upon the stem, one end of the stem being screw threaded and projecting between said devices, and a fender screwed upon the threaded end of the stem and located between the cultivating devices, said fender coöperating to hold the devices against movement longitudinally of the stem in one direction.

In testimony that I claim the foregoing as my own, I have hereto affixed my signature in the presence of two witnesses.

GEORGE M. ROPER.

Witnesses:
    E. A. MAYFIELD,
    ELMO MCCLELLAN.